US012406030B1

(12) United States Patent
Karthik et al.

(10) Patent No.: US 12,406,030 B1
(45) Date of Patent: Sep. 2, 2025

(54) MANAGING RESOURCES USING A GRAPH INFERENCE MODEL TO INFER TAGS

(71) Applicant: Dell Products L.P., Round Rock, TX (US)

(72) Inventors: Rajini Ramachandran Karthik, Austin, TX (US); Muzhar S. Khokhar, Shrewsbury, MA (US); Andrea Roggerone, Dublin (IE); Vinay Sawal, Fremont, CA (US); Ratnesh Yadav, Kirkland, WA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/931,421

(22) Filed: Oct. 30, 2024

(51) Int. Cl.
*G06F 16/901* (2019.01)
*G06F 18/2415* (2023.01)

(52) U.S. Cl.
CPC ...... *G06F 18/2415* (2023.01); *G06F 16/9024* (2019.01)

(58) Field of Classification Search
CPC .......... G06F 18/2415; G06F 16/9024
See application file for complete search history.

(56) References Cited

U.S. PATENT DOCUMENTS

| | | | |
|---|---|---|---|
| 9,569,558 B1* | 2/2017 | Bigelow | G06F 16/252 |
| 10,157,226 B1* | 12/2018 | Costabello | G06N 5/022 |
| 10,685,071 B2* | 6/2020 | Patterson | G06F 16/2428 |
| 11,157,560 B2* | 10/2021 | Zhuang | G06F 16/24542 |
| 11,520,828 B2* | 12/2022 | Agarwal | G06Q 10/0633 |
| 11,687,801 B2* | 6/2023 | Rais-Ghasem | G06N 5/02 706/45 |
| 12,231,456 B2* | 2/2025 | Zawadowskiy | G06F 16/9024 |
| 12,327,196 B2* | 6/2025 | Beguerisse-Díaz | G06N 5/02 |
| 2008/0162777 A1* | 7/2008 | Kaiser | G06F 16/9024 707/E17.011 |
| 2017/0091246 A1* | 3/2017 | Risvik | G06F 16/2471 |
| 2019/0042951 A1* | 2/2019 | Lin | G06N 20/00 |
| 2020/0110776 A1* | 4/2020 | Pollard | G06F 16/9024 |
| 2021/0173831 A1* | 6/2021 | Crabtree | G06F 16/245 |

(Continued)

OTHER PUBLICATIONS

Mežnar et al., "Ontology Completion with Graph-Based Machine Learning: A Comprehensive Evaluation", 2022, MDPI, pp. 1107-1123 (Year: 2022).*

(Continued)

*Primary Examiner* — Jorge A Casanova
(74) *Attorney, Agent, or Firm* — WOMBLE BOND DICKINSON (US) LLP

(57) ABSTRACT

Methods and systems for managing operation of data processing systems are disclosed. A management system may obtain resource data based on operation of the data processing systems while using resources managed by the management system. The resource data may be semantically enhanced based on ontology definitions and represented as a graph structure. The graph structure may be used by a graph inference model (e.g., a graph neural network) to obtain predicted tags for the resources. The graph inference model may be based on a plurality of graph structures that may provide information regarding generalized relationships between at least the resources. The predicted tags may be used by the management system to update operation of the data processing systems.

20 Claims, 7 Drawing Sheets

(56) References Cited

U.S. PATENT DOCUMENTS

| | | | |
|---|---|---|---|
| 2021/0209072 A1* | 7/2021 | Trim | G06F 40/30 |
| 2022/0237446 A1* | 7/2022 | Lei | G06N 3/045 |
| 2022/0237447 A1* | 7/2022 | Lei | G06F 16/284 |
| 2023/0125711 A1* | 4/2023 | Li | G06F 40/30 704/9 |
| 2024/0028646 A1* | 1/2024 | Ramsl | G06F 16/9024 |
| 2024/0061883 A1* | 2/2024 | Vadapandeshwara | G06F 16/9024 |
| 2024/0193400 A1* | 6/2024 | Varghese | G06F 40/20 |
| 2025/0217124 A1* | 7/2025 | Hoy | G06F 8/433 |

OTHER PUBLICATIONS

Trappey et al., "Ontology-based Neural Network for Patent Knowledge Management in Design Collaboration", 2013, International Journal of Production Research, vol. 51, No. 7, pp. 1992-2005 (Year: 2013).*

* cited by examiner

MANAGING RESOURCES USING A GRAPH INFERENCE MODEL TO INFER TAGS

FIELD

Embodiments disclosed herein relate generally to managing operation of data processing systems. More particularly, embodiments disclosed herein relate to managing operation of the data processing systems by using an inference model to infer tags for resources used by the data processing systems based on resource data.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
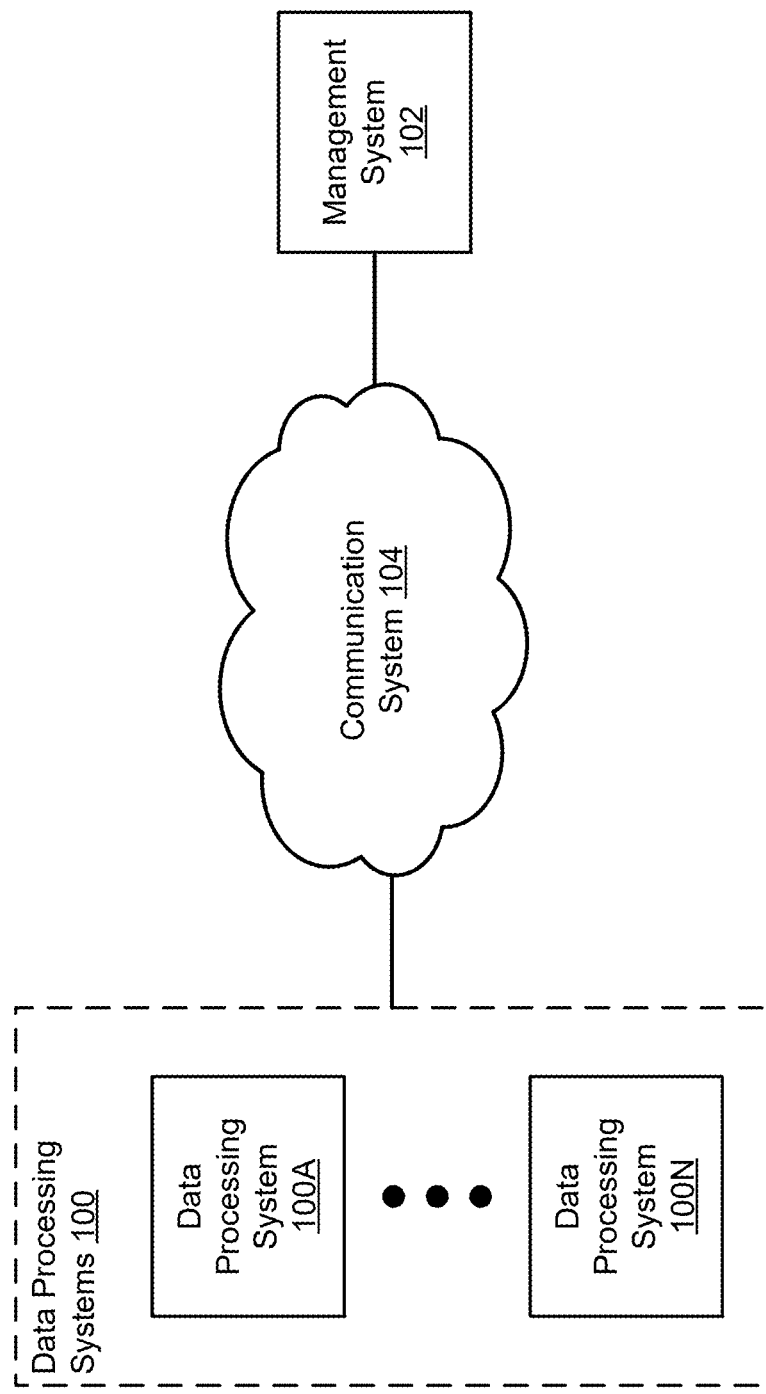
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of data processing systems. While operating, the data processing systems may utilize resources managed by a management system. The operation of the data processing systems may be managed by performing an update to at least a portion of the data processing systems.

The update may be performed based on resource data obtained by the management system from the data processing systems. The resource data may be based on operation of the data processing systems while using the resources managed by the management system. Once obtained, the management system may identify enhanced information regarding the resource data based at least in part on ontology definitions. The ontology definitions may provide a predefined schema (e.g., controlled vocabulary, domain knowledge, data format, etc.) for classifying portions of the resource data.

The management system may subsequently obtain a graph structure based on the enhanced information and the resource data. The graph structure may include, for example, nodes based on the resources and edges based on relationships between the resources. The graph structure may be stored in a graph repository that may include any number of other graph structures (e.g., that may be previously obtained based on historically collected resource data). The graph repository may be used to train a graph inference model (e.g., a graph neural network).

The graph neural network may be based on a plurality of graph structures in the graph repository that may be semantically enhanced with validated tags (e.g., by an entity tasked with managing training of the graph neural network). Using the graph neural network, the management system may obtain a predicted tag for at least a portion of the graph structure.

The predicted tag may be utilized to facilitate management of the resources used by the data processing systems. For example, the predicted tag may be stored in a metadata repository and used by the management system to label and/or group at least a portion of the data processing systems. Based on a request to service the portion of the data processing systems, the management system may identify the portion of the data processing systems based on a tag associated with the portion of the data processing systems and update operation of the portion of the data processing systems. The updated portion of the data processing systems may subsequently provide improved computer-implemented services.

Thus, embodiments disclosed herein may provide an improved method for managing operation of data processing systems by using a graph neural network to predict tags based on a graph structure representing resource data obtained from the data processing systems. By doing so, a quality of computer-implemented services provided by the data processing systems may be improved.

In an embodiment, a method for managing operation of data processing systems is provided. The method may include: (i) obtaining, by a management system and from the data processing systems, resource data based on operation of the data processing systems while using resources managed by the management system; (ii) identifying, by the management system, enhanced information regarding the resource data based at least in part on ontology definitions, the ontology definitions providing a predefined schema for classifying portions of the resource data; (iii) obtaining, by the management system, at least one graph structure based on the enhanced information, the at least one graph structure comprising nodes based on the resources, and edges based on relationships between the resources; (iv) obtaining, by the management system and using a graph inference model, at least one predicted tag for at least a portion of the graph structure; (v) servicing, by the management system and using the at least one predicted tag and the at least one graph structure, a request for updating operation of the data processing systems to obtain updated data processing systems; and (vi) providing computer-implemented services using the updated data processing systems.

Identifying the enhanced information may include: (i) mapping each resource of the resources indicated by the resource data according to the predefined schema; and (ii) adding the enhanced information for the each resource based on the ontology definitions.

The graph inference model may include a graph neural network.

The graph neural network may be based on a plurality of graph structures that are semantically enhanced with validated tags for at least a portion of the plurality of graph structures.

The validated tags may provide information regarding generalized relationships between the at least a portion of the plurality of graph structures.

Obtaining the predicted tag may include: inferring, using the graph neural network, the predicted tag for the at least a portion of the graph structure based on the plurality of graph structures that are semantically enhanced.

The method may also include: updating, by the management system, the ontology definitions based on new semantic information identified by an entity tasked with managing the ontology definitions.

Servicing the request for updating operation of the data processing systems may include: (i) identifying a portion of the data processing systems based on one or more tags applied to the portion of the data processing systems; (ii) identifying an action set to perform on the identified portion of the data processing systems based on the request; and (iii) performing the action set to modify operation of the portion of the data processing systems.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide for management of data processing systems that may provide, at least in part, computer-implemented services (e.g., to user of the system and/or devices operably connected to the system).

The computer-implemented services may include any type and quantity of computer-implemented services. The computer-implemented services may include, for example, database services, data processing services, electronic communication services, and/or any other services that may be provided using one or more computing devices. The computer-implemented services may be provided by, for example, data processing systems 100, management system 102, and/or any other type of devices (not shown in FIG. 1). Other types of computer-implemented services may be provided by the system shown in FIG. 1 without departing from embodiments disclosed herein.

To provide at least a portion of the computer-implemented services, the data processing systems may use resources hosted and/or managed by a management system. The resources may include, for example, cloud services, computational resources, data storage, and/or any other resources that may support operation of the data processing systems. Based on a request to service at least a portion of the data processing systems, the management system may update operation of the portion of data processing systems.

To update the operation of the portion of data processing systems, the management system may group any number of data processing systems and/or resources used by the data processing systems using tags. The tags may include information usable to identify the resources and may include, for example, resources names, attributes, relationships, and/or any other information. The tags may be applied to the portions of the data processing systems by an entity tasked with managing the resources based on resource data obtained from the data processing systems and subsequently used to filter resources and/or data processing systems based on the tags.

However, because the data processing systems may operate in various environments and/or domains, resource data obtained from the data processing systems may provide limited information usable by the management system to tag resources. For example, data processing systems operating using different architectures (e.g., on premise, public cloud, etc.) and/or different domains may organize data in different manners (e.g., different data types, vocabulary, etc.). By operating as such, an ability of the management system to process the resource data obtained from the different data processing systems for identifying tags may be limited.

In general, embodiments disclosed herein may provide methods, systems, and/or devices for managing data processing systems. To improve an ability of a management system to identify updates for a portion of the data processing systems, the management system may use predicted tags obtained using a graph inference model. The graph inference model may predict tags based on a graph structure of semantically enhanced resource data obtained from the data processing systems.

To obtain the semantically enhanced resource data, the management system may obtain resource data from the data processing systems relevant to operation of the data processing systems while using the resources managed by the management system. The resource data may be ingested (e.g., via a secure communication channel) and/or aggregated by the management system to prepare the resource data for semantic enhancement and/or inferencing. For example, the resource data may be cleaned, normalized, data fields may be identified, and/or any other processes may be performed. The resource data may subsequently be mapped based on ontology definitions.

The ontology definitions be obtained and/or generated by the management system. For example, the management system may obtain a predefined ontology (e.g., managed by a remote entity) relevant for a domain of resources managed by the management system and/or the ontology definitions may be generated (e.g., by a subject matter expert) based on knowledge of key concepts, relationships, and hierarchical structures relevant to the domain. may provide a predefined schema (e.g., controlled vocabulary, domain knowledge, data format, etc.) for classifying portions of the resource data. Furthermore, the ontology definitions may be updated at any time based on new information identified by an entity tasked with managing the ontology definitions.

Using the ontology definitions, resources indicated by the resource data may be mapped according to the predefined schema. For example, the resource data may be mapped based on a class element (e.g., a resource type), properties (e.g., relationships between class elements), and logical constraints defined by the schema that indicate a structure of the resource data. Additionally, enhanced information may be added to a resource by applying relationships to connect related data points of the resource data and thereby providing enhanced contextual information.

The management system may subsequently obtain a graph structure based on the enhanced information and the resource data. The graph structure may include, for example, nodes based on the resources and edges based on relationships between the resources. The graph structure may be stored in a graph repository that may include any number of other graph structures (e.g., that may be previously obtained based on historically collected resource data). The graph repository may be used to train a graph inference model (e.g., a graph neural network).

The graph neural network may be based on a plurality of graph structures in the graph repository that may be semantically enhanced with validated tags (e.g., by an entity tasked with managing training of the graph neural network). For example, the graph neural network may be obtained based on supervised learning using the plurality of graph structures (e.g., based on historically collected resource data) to identify generalized relationships between portions of the plurality of graph structures. Using the graph neural network, the management system may obtain a predicted tag for at least a portion of the graph structure.

The predicted tag may be utilized to facilitate management of the resources used by the data processing systems. For example, the predicted tag may be stored in a metadata repository and used by the management system to label and/or group at least a portion of the data processing systems. Predicted tags may be reviewed (e.g., by an entity tasked with managing the management system) to apply the tags as metadata to the resources and/or provide feedback for improving a predictive capability of the graph neural network. By applying the predicted tag to the resource, the tag for the resource may be used by the management system to perform management functions.

For example, based on a request to service the portion of the data processing systems, the management system may identify the portion of the data processing systems based on a tag associated with the portion of the data processing systems and update operation of the portion of the data processing systems. To update operation of the portion of the data processing systems, the management system may, for example, (i) group the portion of the data processing systems based on tags, (ii) update configurations of resources used by the portion of data processing systems, (iii) enable and/or restrict access to a portion of resources, and/or perform any other actions. The updated portion of the data processing systems may subsequently provide improved computer-implemented services.

To provide the above noted functionality, the system may include data processing systems 100, and management system 102. Each of these components is discussed below.

Data processing systems 100 may include any number of data processing systems (e.g., 100A-100N) that may provide at least a portion of the computer-implemented services (e.g., to users of data processing system 100). To do so, data processing systems 100 may utilize resources that may be managed by management system 102. For example, data processing systems 100 may access software and/or other resources (e.g., compute power, storage, networking, etc.) hosted on servers (e.g., cloud servers) to provide the portion of computer-implemented services. While utilizing the resources, data processing systems may collect resource data relevant to use of the resources and/or communicating the resource data to management system 102.

As discussed above, management system 102 may provide resource management services. To provide the resource management services, management system 102 may (i) obtain resource data from data processing systems 100, (ii) obtain and/or apply an ontology definition to the resource data to obtain semantically enhanced resource data, (iii) obtain a graph structure based on the semantically enhanced resource data, (iv) obtain a graph inference model (e.g., a trained graph neural network), (v) obtain predicted tags using the graph inference model and based on the graph structure, and/or perform any other actions.

In response to a request to update operation of data processing systems 100, management system 102 may utilize the tags to identify a portion of resources used by the data processing systems 100 and/or a portion of data processing systems 100 to update. For example, management system 102 may update a configuration of the resource, enforce a policy on the identified portion of the resources, aggregate additional data (e.g., financial data, cost allocation, etc.) relevant to use the resources, and/or perform any other updates.

While providing their functionality, any of data processing systems 100 and/or management system 102 may provide all or a portion of the methods shown in FIGS. 2A-3B.

Communication system 104 may allow any of data processing systems 100, and management system 102 to communicate with one another (and/or with other devices not illustrated in FIG. 1). To provide its functionality, communication system 104 may be implemented with one or more wired and/or wireless networks. Any of these networks may be a private network (e.g., the "Network" shown in FIG. 4), a public network, and/or may include the Internet. For example, data processing systems 100 may be operably connected to management system 102 via the Internet. Data processing systems 100, management system 102, and/or communication system 104 may be adapted to perform one or more protocols for communicating via communication system 104.

Any of (and/or components thereof) data processing systems 100, and management system 102 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Thus, as shown in FIG. 1, a system in accordance with an embodiment may manage operation of data processing systems by using ontology definitions and a graph inference model to infer tags based on resource data. By doing so, an ability of a management system to update operation of data processing systems may be improved.

While illustrated in FIG. 1 with a limited number of specific components, a system may include additional, fewer, and/or different components without departing from embodiments disclosed herein.

Figure 2A:
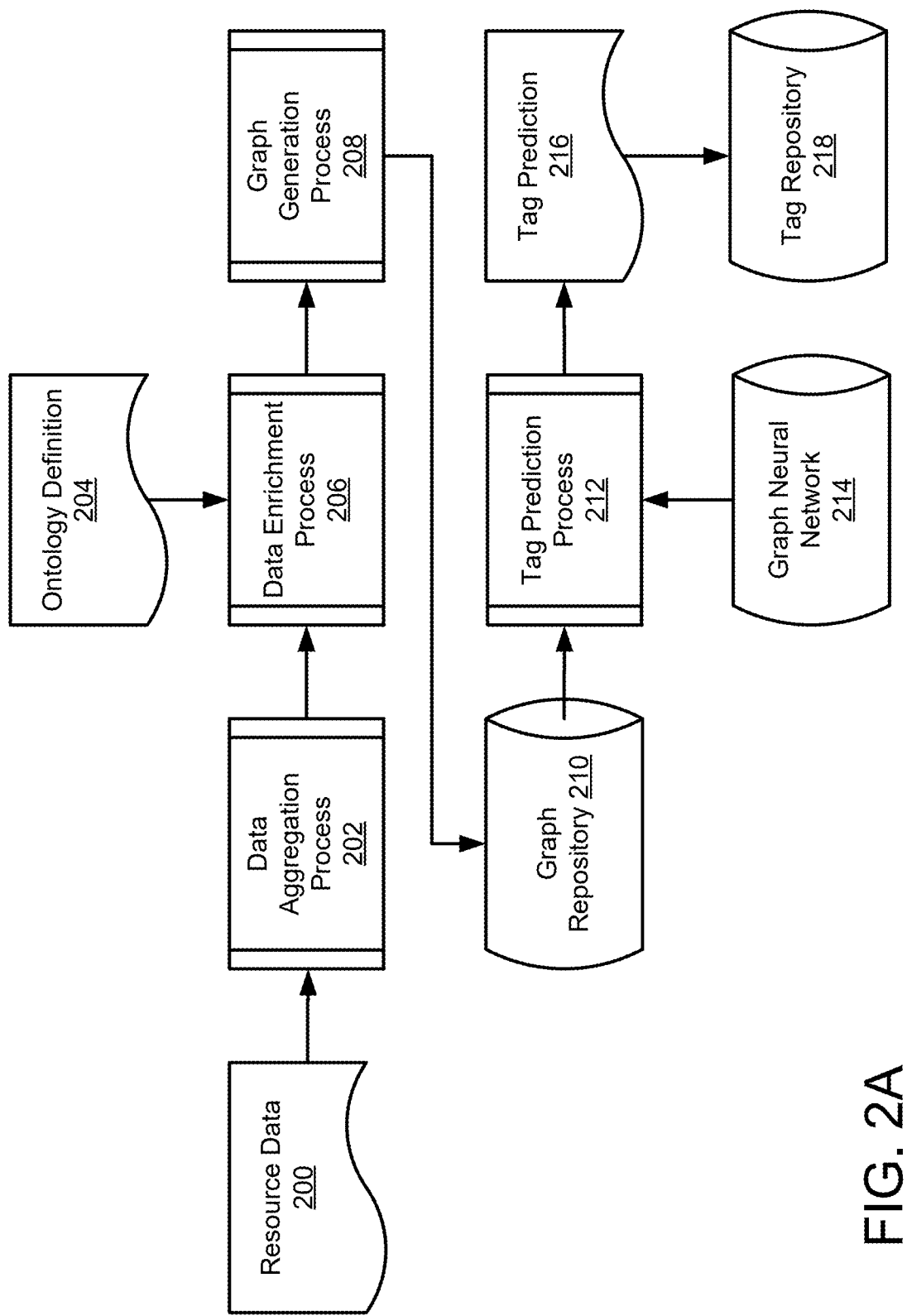
FIGS. 2A-2C show data flow diagrams in accordance with an embodiment.
Figure 2B:
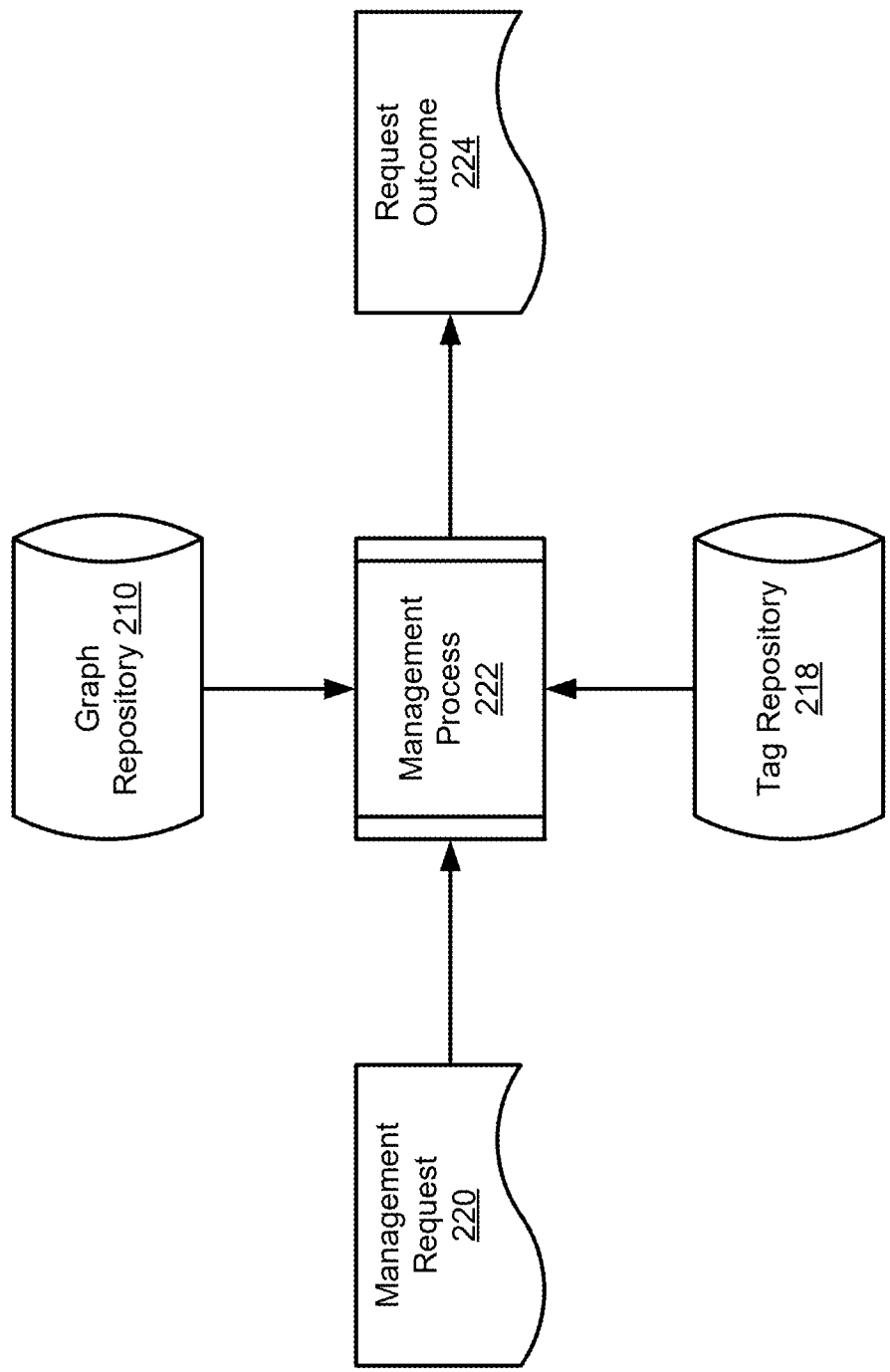
Figure 2C:

To further clarify embodiments disclosed herein, data flow diagrams in accordance with an embodiment are shown in FIGS. 2A-2C. In these diagrams, flows of data and processing of data are illustrated using different sets of shapes. A first set of shapes (e.g., 200, 204, etc.) is used to represent data structures, a second set of shapes (e.g., 202, 206, etc.) is used to represent processes performed using and/or that generate data, and a third set of shapes (e.g., 210, 214, etc.) is used to represent large scale data structures such as databases.

Turning to FIG. 2A, a first data flow diagram in accordance with an embodiment is shown. The first data flow diagram may illustrate data used in and data processing performed in predicting tags based on resource data obtained by a management system and from the data processing systems.

Resource data 200 may include any number and type of data related to resources used by data processing systems 100. For example, resource data 200 may include resource name, resource type, usage statistics, relationships, descriptions, and/or any other information. Resource data may be obtained by data processing systems 100, for example, using agents that may collect data (e.g., telemetry data, raw data, etc.) of the resources and transmit the data to management system 102.

To predict tags based on the resource data, data aggregation process 202 may be performed. During data aggregation process 202, resource data 200 may be ingested by management system 102, and resource data 200 may be prepared for inferencing. For example, to ingest resource data 200, management system 102 may (i) receive resource data 200 via a secure communication channel and over any period of time (e.g., real-time streaming, batches, etc.), (ii) validate a source of resource data 200, (iii) store, at least temporarily, resource data 200 in data storage, and/or perform any other actions. Once ingested, resource data 200 may be prepared for inferencing. For example, resource data 200 may be prepared by (i) pre-processing resource data 200 (e.g., cleaning, formatting, etc.), (ii) identifying feature vectors based on resource data 200, and/or any other processes. Once aggregated, enhanced information may be identified based on resource data 200.

Ontology definition 204 may include any number and type of related to a predefined schema for classifying portions of resource data 200. For example, ontology definition 204 may be implemented using an ontology language model (e.g., web ontology language, resource description framework schema, etc.), a directed graph data structure, a hierarchical data structure, triples, and/or any other structures. Furthermore, ontology definition 204 may provide information to define relationships between the portions of resource data 200. For example, ontology definition may include logical expressions, properties, and/or any other attributes that may provide semantic context for resource data 200.

To identify enhanced information based on resource data 200, data enrichment process 206 may be performed. During data enrichment process 206, ontology definition 204 may be applied to resource data 200. For example, to apply ontology definition 204, (i) each resource indicated by resource data 200 may be mapped according to a corresponding entity of ontology definition 204, (ii) vocabulary used based on various data sources may be aligned to shared concepts defined by ontology definition 204, (iii) semantic metadata (e.g., relationships, contextual information, etc.) may be added to portions of resource data 200, and/or any other processes to obtain semantically enhanced resource data. Once obtained, the semantically enhanced resource data may be used to obtain a graph structure.

To obtain a graph structure based on the semantically enhanced resource data, graph generation process 208 may be performed. During graph generation process 208, the semantically enhanced resource data may be represented as a graph structure. For example, to represent the semantically enhanced resource data as a graph structure, (i) the semantically enhanced resource data may be stored in a graph database, (ii) a set of nodes may be generated based on resources of the semantically enhanced resource data, (iii) a set of edges may be generated that connect nodes of the set of nodes based on relationships between the resources, (iv) an adjacency matrix may be created, and/or any other processes may be performed. Once obtained, the graph structure may be stored in graph repository 210 (e.g., for use as inputs to a graph inference model).

Graph repository 210 may include any number and type of storage for graph structures relevant to resource data 200. For example, graph repository 210 may include a graph database that may store data relevant to the graph structure in any format (e.g., a non-structured query language database, tables, etc.). Each graph structure may include information relevant to relationships between nodes of the each graph structure and/or may be stored in graph repository 216, for example, as key-value pairs, labels, and/or any other data item.

To obtain at least one predicted tag based on resource data 200, tag prediction process 212 may be performed. During tag prediction process 212, any number of graph structures may be obtained from a graph repository, and the at least one predicted tag may be inferred using graph neural network 214. For example, to obtain the any number of graph structures, (i) graph repository 210 may be queried to obtain one or more desired graph structures, (ii) the desired graph structures may be retrieved from graph repository 210, and/or any other actions may be performed. Once obtained, the graph structures may be used to infer a predicted tag. For example, to infer the predicted tag, (i) graph neural network 214 may be configured for inferencing (e.g., model selection, propagation logic, etc.), (ii) the graph structure may be ingested by graph neural network 214 (e.g., by creating a graph data object based on the graph structure), (iii) a desired tag prediction may be generated (e.g., based on node labels, edge links, graph classifications, etc.), (iv) the tag prediction may be evaluated, and/or any other processes may be performed. By doing so, tag prediction 216 may be obtained that may be used provide tags and/or metadata to the resources used by data processing systems 100 and/or support management functions by management system 102.

Graph neural network 214 may include any number and type of information relevant to an inference model usable to provide inferences based on graph data. For example, graph neural network 214 may include (i) a graph neural network architecture, (ii) a set of weights and/or parameters established during training of graph neural network 214, (iii) software resources and/or libraries (e.g., PyTorch, TensorFlow, etc.), and/or any other information. Graph neural network may be trained based on a plurality of graph structures (e.g., based on historical resource data collected from data processing systems 100). Refer to FIG. 2B for additional details regarding obtaining a trained graph neural network.

Tag prediction 216 may include any number and type of information regarding a prediction based on at least a portion of a graph structure. For example, tag prediction 216 may include (i) a label inferred for a one or more nodes that may not have an existing tag, (ii) links associated with unlabeled edges, (iii) a classification for the portion of the graph structure), and/or any other inferences. Once obtained, tag prediction 216 may be stored in tag repository 218 and/or used in adding metadata to resources managed by management system 102.

Tag repository 218 may include any number and type of information related to tags predicted for and/or assigned to resources managed by management system 102. Tag repository 218 may organize tags, for example, by (i) storing in a database (e.g., as key-value pairs), (ii) preparing any number of tag predictions to be reviewed (e.g., by an entity tasked with managing tags), (iii) associating tags with portions of resources (e.g., as metadata), (iv) maintaining a metadata portion of the repository, and/or any other processes.

Thus, using the data flow shown in FIG. 2A, resource data may be semantically enhanced using ontology to obtain a graph structure that may be used by a graph neural network to obtain a tag prediction. By doing so, the tag prediction may provide enhanced information regarding resources used by data processing systems while providing computer-implemented services.

Turning to FIG. 2B, a second data flow diagram in accordance with an embodiment is shown. The second data flow diagram may illustrate data used in and data processing performed in servicing a request for updating operation of data processing systems.

Management request 220 may include any type and/or quantity of information regarding updating an operation of data processing systems 100 and/or resources used by data processing systems 100. For example, management request 220 may include a request to (i) group a portion of resources for which to perform a management action, (ii) update a configuration of the portion of resources, and/or any other purposes. Management request 220 may further include, for example, a specified portion of data processing systems 100, a classification of resources to update, and/or any other information to identify the portion of resources.

To identify at least one update to perform, management process 222 may be performed. During management process 222, tags and/or graph structures associated with the resources may be analyzed, and management request 220 may be serviced. The tags and/or graph structures may be analyzed, for example, by: (i) querying and/or filtering graph repository 210 and/or tag repository 218 based on management request 220, (ii) retrieving at least one graph structure from graph repository 210, (iii) identifying relationships between attributes of and/or portions of the resources based on management request 220, and/or performing any other actions to identify a portion of the resources and/or data processing systems 100 to perform the at least one update.

For example, to service management request 220, management system 102 may (i) enforce a policy on the identified portion of the resources, (ii) enable and/or restrict access to resources based on the tags, (iii) aggregate additional data (e.g., financial data, cost allocation, etc.) relevant to use the resources, (iv) generate a report based on the portion of the resources, and/or perform any other actions. By servicing the request, request outcome 224 may be obtained.

Request outcome 224 may include any type and/or quantity of information requestion an outcome of management process 222. For example, request outcome 224 may include (i) a status (e.g., a confirmation) of an action performed during management process 222, (ii) instructions for at least one other action to perform based on the tags, (iii) a report generated relevant to the portion of the resources during management process 222, and/or any other information. Therefore, request outcome 224 may be used in obtaining updated data processing systems that may provide computer-implemented services.

Thus, using the data flow shown in FIG. 2B, operation of data processing systems may be updated based on information obtained from tags and/or graph structures relevant to resources used by the data processing systems. By doing so, a quality of computer-implemented services provided by the updated data processing systems may be improved.

Turning to FIG. 2C, a third data flow diagram in accordance with an embodiment is shown. The third data flow diagram may illustrate data used in and data processing performed in obtaining a trained graph neural network for predicting tags.

As previously discussed in FIG. 2A, graph repository 210 may include a plurality of graph structures based on historically collected resource data from data processing systems 100. The plurality of graph structures may include a labeled portion and/or an unlabeled portion of information regarding nodes and/or edges of the graph structures. Furthermore, the plurality of graph structures may be semantically enhanced with validated tags for at least a portion of each graph structure. For example, tags may have been applied to portions of the plurality of graph structures by an entity tasked with managing the graph structures (e.g., a subject matter expert, an administrator, etc.).

To obtain a trained graph neural network, inference model generation process 226 may be performed. During inference model generation process 226, training data may be obtained, and a graph neural network may be initialized, and the graph neural network may be trained. The training data may be obtained, for example, by (i) selecting graph structures that be semantically enhanced via a previous iteration of tag predictions, (ii) validating tags associated with the plurality of graph structures by an entity tasked with managing the graph structures (e.g., a subject matter expert, an administrator, etc.), (iii) adding labels to portions of the plurality of graph structures that may be previously unlabeled, (iv) assigning features to each node of a graph structure, (v) splitting data into training data and test data, and/or any other actions.

The graph neural network may be initialized by (i) selecting a graph neural network framework (e.g., PyTorch, TensorFlow, etc.), (ii) defining a set of structural parameters (e.g., number of layers, pooling functions, etc.), and/or any other processes. Once initialized, the graph neural network may be trained. The graph neural network may be trained by (i) performing a forward pass using the training data (e.g., plurality of graph structures with validated tags), (ii) obtaining a result based on the forward pass, (iii) evaluating the result (e.g., accuracy of predicted labels compared to the validated labels), (iv) modifying parameters of the graph neural network to improve a predictive capability, and/or any other processes to obtain graph neural network 228.

Similar to graph neural network 214, graph neural network 228 may include any number and type of information relevant to an inference model usable to provide inferences based on graph data. For example, graph neural network 228 may trained using similar or graph structures used to train graph neural network 214 that may result in a set of weights and/or parameters usable to generated predicted tags based on resource data.

Thus, using the data flow shown in FIG. 2C, a trained graph neural network may be obtained based on a plurality of graph structures and based on validated tags. By doing so, a the trained graph neural network may be utilized in predicting tags based on new resource data obtained by a management system.

Any of the processes illustrated using the second set of shapes and interactions illustrated using the third set of shapes may be performed, in part or whole, by digital processors (e.g., central processors, processor cores, etc.)

that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
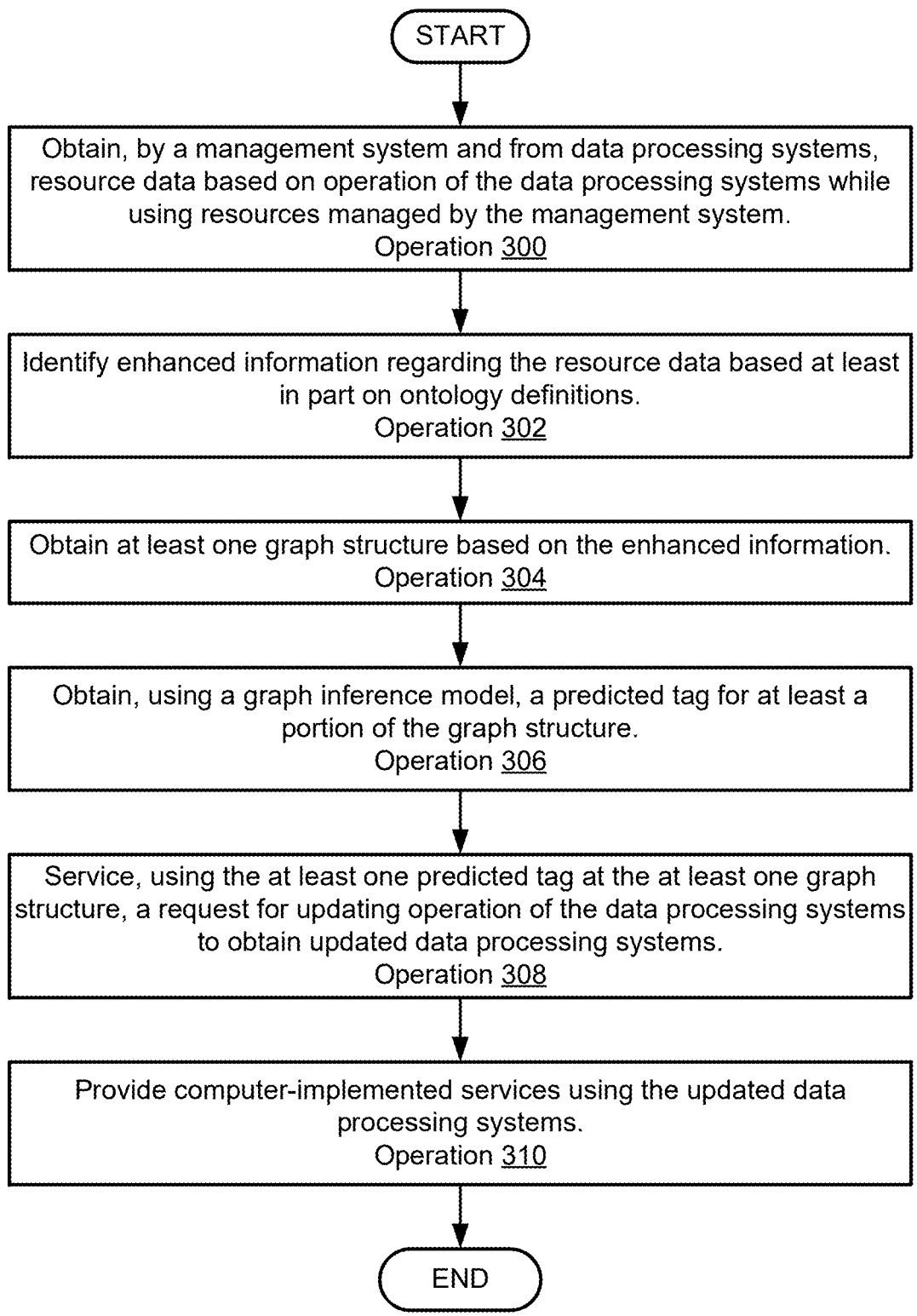
FIGS. 3A-3B show flow diagrams illustrating methods in accordance with an embodiment.
Figure 3B:
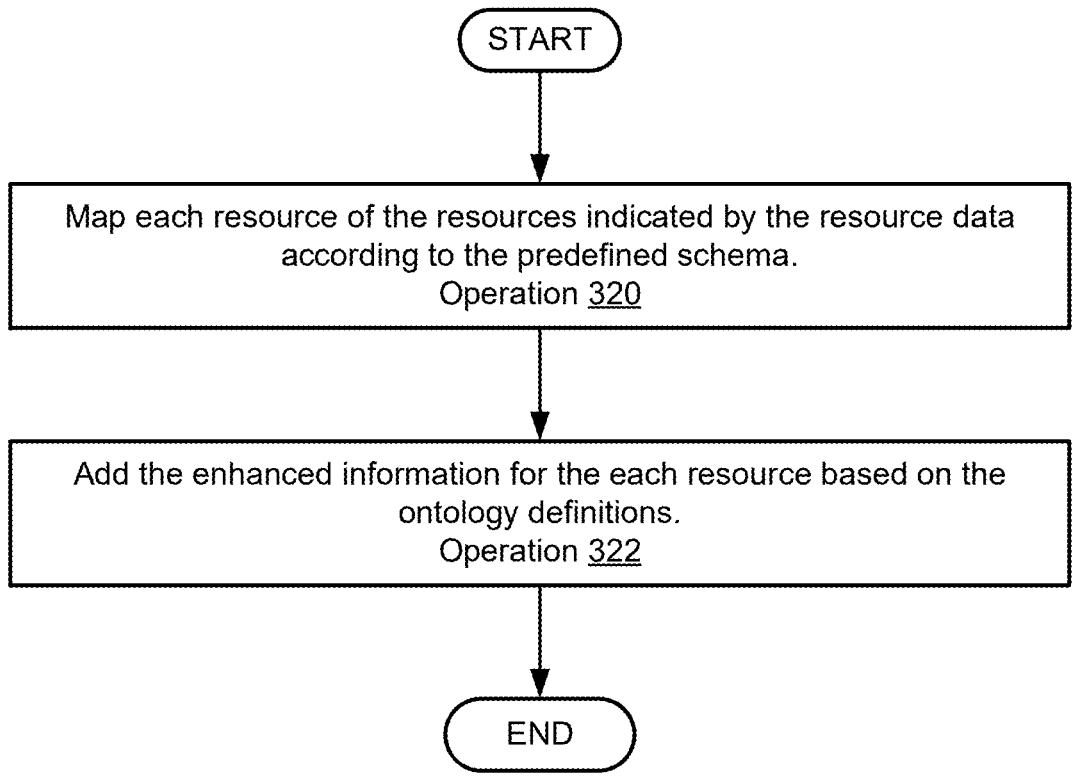

As discussed above, the components of FIG. 1 may perform various methods to manage data processing systems. FIGS. 3A-3B illustrate methods that may be performed by the components of the system of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of managing operation of data processing systems in accordance with an embodiment is shown. The method may be performed, for example, by any of the components of the system of FIG. 1, and/or other components not shown therein.

At operation 300, resource data based on operation of the data processing systems while using resources managed by a management system may be obtained by the management system and the data processing systems. The resource data may be obtained by: (i) collecting data (e.g., telemetry data) on each data processing system of the data processing systems using a software agent hosted by the each data processing system, (ii) transmitting the resource data via a secure communication channel to the management system, (iii) storing the resource data in storage for subsequent retrieval at scheduled intervals by the management system, and/or any other processes.

At operation 302, enhanced information regarding the resource data may be identified based at least in part on ontology definitions. The enhanced information may be identified by: (i) mapping each resource indicated by the resource data to a corresponding entity of the ontology definition, (ii) aligning vocabulary used based on various data sources to shared concepts defined by ontology definition, (iii) formatting a hierarchical structure (e.g., properties, sub-properties, etc.) according to a predefined schema, (iv) adding semantic metadata (e.g., relationships, contextual information, etc.) to portions of the resource data, and/or any other processes.

At operation 304, at least one graph structure may be obtained based on the enhanced information. The at least one graph structure may be obtained by: (i) storing the semantically enhanced resource data in a graph database, (ii) generating an adjacency matrix based on the resource data that indicates whether portions of resources are adjacent to each other, (iii) generating nodes and edges based on the resources and relationships between the resources, (iv) labeling at least a portion the nodes and edges based on the enhanced information, and/or any other processes.

At operation 306, a predicted tag may be obtained for at least a portion of the graph structure using a graph inference model. The predicted tag may be obtained by: (i) obtaining a graph neural network that may be trained on a plurality of graph structures that may be semantically enhanced using validated tags, (ii) ingesting the graph structure as input data to the graph neural network, (iii) obtaining an inference result from the graph neural network based on a defined classification task for tags, (iv) storing the predicted tag in a tag repository for review by a user of the management system and/or for automated application towards metadata of the resource, and/or any other processes.

At operation 308, a request for updating operation of the data processing systems may be serviced to obtain updated data processing systems. The request may be serviced by: (i) modifying a configuration of the resources based on the request, (ii) enforcing a policy on the identified portion of the resources, (ii) enabling and/or restricting access to resources based on the tags, (iii) aggregating additional data (e.g., financial data, cost allocation, etc.) relevant to use the resources, (iv) generating a report based on the portion of the resources, and/or performing any other actions.

At operation 310, computer-implemented services may be provided using the updated data processing systems. The computer-implemented services may be provided by: (i) installing and/or updating software relevant to the resources on the data processing systems, (ii) executing instructions specified by the updated software on the other data processing systems, (iii) monitoring for new resource data collected by the data processing systems while using updated resources, and/or any other processes.

The method may end following operation 310.

Using the method shown in FIG. 3A, a predicted tag may be generated using a graph neural network based on a graph representation of resource data that may be semantically enhanced using an ontology definition. The predicted tag may be used to update operation of data processing systems while using resources that may improve a quality of computer-implemented services provided by the data processing systems.

Turning to FIG. 3B, a second flow diagram illustrating a method of semantically enhancing resource data using ontology definitions in accordance with an embodiment is shown. The method may be performed, for example, by any of the components of the system of FIG. 1, and/or other components not shown therein.

At operation 320, each resource may be mapped according to the predefined schema. The each resource may be mapped by: (i) unifying resources under shared concepts defined by the ontology definition, (ii) aligning terms used in the resource data obtained from data processing systems operating in various environments based on domain specific definitions indicated by the ontology definition, and/or any other processes.

At operation 322, the enhanced information may be added for each resource based on the ontology definitions. The enhanced information may be added by: (i) applying predefined relationships between classes of the ontology definitions, (ii) adding domain specific knowledge as attributes for each resource, (iii) adding contextual information for the each resource, and/or any other processes.

The method may end following operation 322.

Using the method shown in FIG. 3B, a resource data obtained by a management system and from data processing systems may be semantically enhanced using an ontology definition. By doing so, the semantically enhanced resource data may be used to improve a quality (e.g., accuracy, consistency, etc.) of inferences when used to obtain tag predictions.

Figure 4:
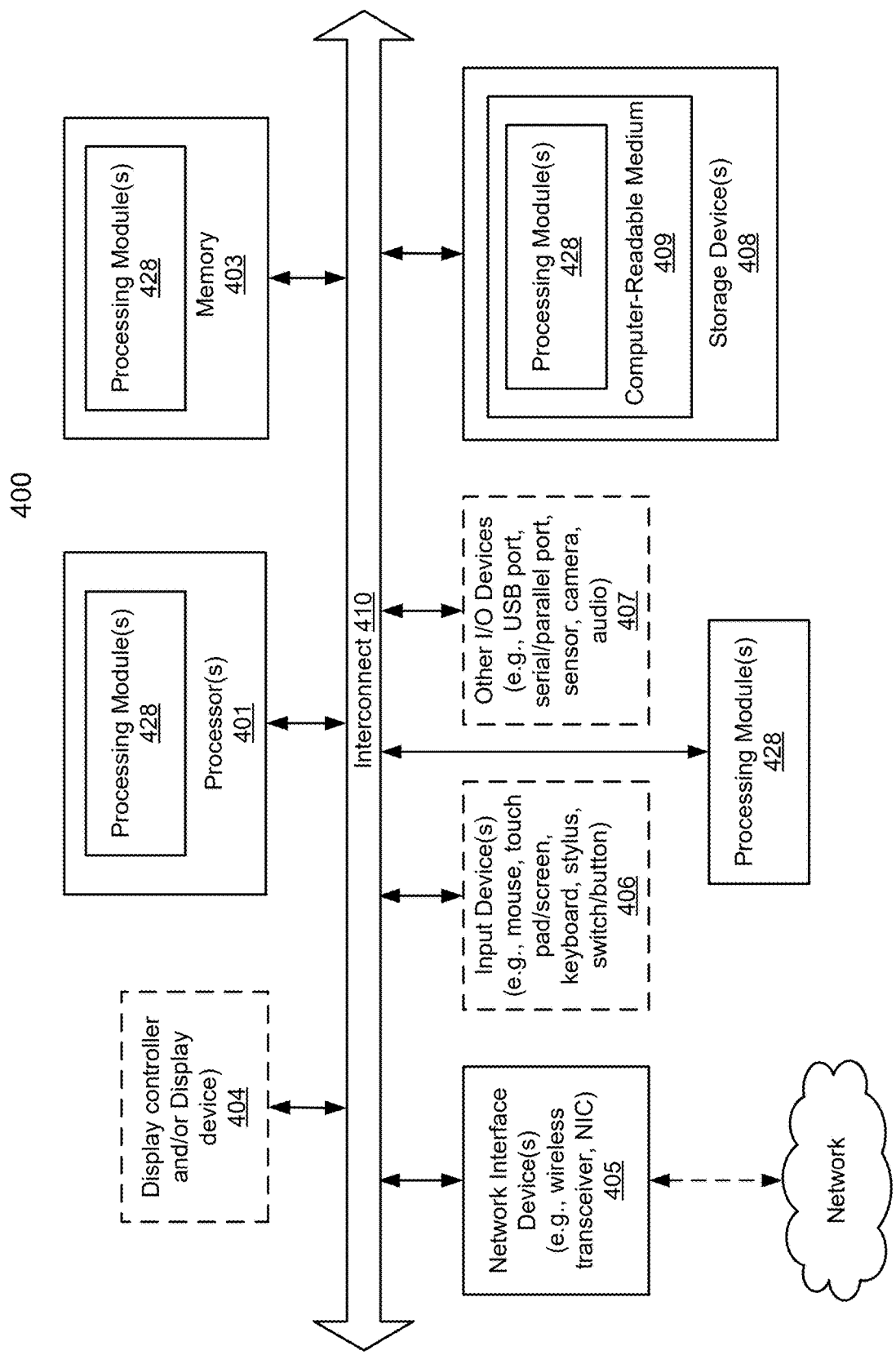
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing operation of data processing systems, the method comprising:
   obtaining, by a management system and from the data processing systems, resource data based on operation of the data processing systems while using resources managed by the management system;
   identifying, by the management system, enhanced information regarding the resource data based at least in part on ontology definitions, the ontology definitions providing a predefined schema for classifying portions of the resource data;
   obtaining, by the management system, at least one graph structure based on the enhanced information, the at least one graph structure comprising nodes based on the resources, and edges based on relationships between the resources;
   obtaining, by the management system and using a graph inference model, at least one predicted tag for at least a portion of the graph structure;
   servicing, by the management system and using the at least one predicted tag and the at least one graph structure, a request for updating operation of the data processing systems to obtain updated data processing systems; and
   providing computer-implemented services using the updated data processing systems.

2. The method of claim 1, wherein identifying the enhanced information comprises:
   mapping each resource of the resources indicated by the resource data according to the predefined schema; and
   adding the enhanced information for the each resource based on the ontology definitions.

3. The method of claim 1, wherein the graph inference model is a graph neural network.

4. The method of claim 3, wherein the graph neural network is based on a plurality of graph structures that are semantically enhanced with validated tags for at least a portion of the plurality of graph structures.

5. The method of claim 4, wherein the validated tags provide information regarding generalized relationships between the at least a portion of the plurality of graph structures.

6. The method of claim 4, wherein obtaining the predicted tag comprises:
   inferring, using the graph neural network, the predicted tag for the at least a portion of the graph structure based on the plurality of graph structures that are semantically enhanced.

7. The method of claim 1, wherein further comprising:
   updating, by the management system, the ontology definitions based on new semantic information identified by an entity tasked with managing the ontology definitions.

8. The method of claim 1, wherein servicing the request for updating operation of the data processing systems comprises:
   identifying a portion of the data processing systems based on one or more tags applied to the portion of the data processing systems;
   identifying an action set to perform on the identified portion of the data processing systems based on the request; and
   performing the action set to modify operation of the portion of the data processing systems.

9. A non-transitory machine-readable medium having instructions stored therein, which when executed by a processor, cause the processor to perform operations for managing operation of data processing systems, the operations comprising:
   obtaining, by a management system and from the data processing systems, resource data based on operation of the data processing systems while using resources managed by the management system;
   identifying, by the management system, enhanced information regarding the resource data based at least in part on ontology definitions, the ontology definitions providing a predefined schema for classifying portions of the resource data;
   obtaining, by the management system, at least one graph structure based on the enhanced information, the at least one graph structure comprising nodes based on the resources, and edges based on relationships between the resources;
   obtaining, by the management system and using a graph inference model, at least one predicted tag for at least a portion of the graph structure;
   servicing, by the management system and using the at least one predicted tag and the at least one graph structure, a request for updating operation of the data processing systems to obtain updated data processing systems; and
   providing computer-implemented services using the updated data processing systems.

10. The non-transitory machine-readable medium of claim 9, wherein identifying the enhanced information comprises:
    mapping each resource of the resources indicated by the resource data according to the predefined schema; and
    adding the enhanced information for the each resource based on the ontology definitions.

11. The non-transitory machine-readable medium of claim 9, wherein the graph inference model is a graph neural network.

12. The non-transitory machine-readable medium of claim 11, wherein the graph neural network is based on a plurality of graph structures that are semantically enhanced with validated tags for at least a portion of the plurality of graph structures.

13. The non-transitory machine-readable medium of claim 12, wherein the validated tags provide information regarding generalized relationships between the at least a portion of the plurality of graph structures.

14. The non-transitory machine-readable medium of claim 12, wherein obtaining the predicted tag comprises:
    inferring, using the graph neural network, the predicted tag for the at least a portion of the graph structure based on the plurality of graph structures that are semantically enhanced.

15. A data processing system, comprising:
    a processor; and
    a memory coupled to the processor to store instructions, which when executed by the processor, cause the processor to perform operations for managing operation of data processing systems, the operations comprising:
        obtaining, by a management system and from the data processing systems, resource data based on operation of the data processing systems while using resources managed by the management system;

identifying, by the management system, enhanced information regarding the resource data based at least in part on ontology definitions, the ontology definitions providing a predefined schema for classifying portions of the resource data;

obtaining, by the management system, at least one graph structure based on the enhanced information, the at least one graph structure comprising nodes based on the resources, and edges based on relationships between the resources;

obtaining, by the management system and using a graph inference model, at least one predicted tag for at least a portion of the graph structure;

servicing, by the management system and using the at least one predicted tag and the at least one graph structure, a request for updating operation of the data processing systems to obtain updated data processing systems; and providing computer-implemented services using the updated data processing systems.

16. The data processing system of claim 15, wherein identifying the enhanced information comprises:

mapping each resource of the resources indicated by the resource data according to the predefined schema; and adding the enhanced information for the each resource based on the ontology definitions.

17. The data processing system of claim 15, wherein the graph inference model is a graph neural network.

18. The data processing system of claim 17, wherein the graph neural network is based on a plurality of graph structures that are semantically enhanced with validated tags for at least a portion of the plurality of graph structures.

19. The data processing system of claim 18, wherein the validated tags provide information regarding generalized relationships between the at least a portion of the plurality of graph structures.

20. The data processing system of claim 18, wherein obtaining the predicted tag comprises:

inferring, using the graph neural network, the predicted tag for the at least a portion of the graph structure based on the plurality of graph structures that are semantically enhanced.

* * * * *